United States Patent
Okuda et al.

(10) Patent No.: US 11,105,022 B2
(45) Date of Patent: Aug. 31, 2021

(54) CARBON FIBER BUNDLE AND STABILIZED FIBER BUNDLE

(71) Applicant: Toray Industries, Inc., Tokyo (JP)

(72) Inventors: Haruki Okuda, Ehime (JP); Takayuki Yomo, Ehime (JP); Fumihiko Tanaka, Ehime (JP)

(73) Assignee: Toray Industries, Inc., Tokyo (JP)

( * ) Notice: Subject to any disclaimer, the term of this patent is extended or adjusted under 35 U.S.C. 154(b) by 950 days.

(21) Appl. No.: 14/904,725

(22) PCT Filed: Jul. 29, 2014

(86) PCT No.: PCT/JP2014/069890
§ 371 (c)(1),
(2) Date: Jan. 13, 2016

(87) PCT Pub. No.: WO2015/016199
PCT Pub. Date: Feb. 5, 2015

(65) Prior Publication Data
US 2016/0168761 A1 Jun. 16, 2016

(30) Foreign Application Priority Data

Jul. 30, 2013 (JP) .............................. JP2013-157438

(51) Int. Cl.
*D01F 9/12* (2006.01)
*D01D 5/253* (2006.01)
(Continued)

(52) U.S. Cl.
CPC ................ *D01F 9/12* (2013.01); *C01B 32/00* (2017.08); *D01D 5/253* (2013.01); *D01F 9/14* (2013.01); *D01F 6/22* (2013.01)

(58) Field of Classification Search
CPC ........ C01B 31/00; C01B 32/00; D01D 5/253; D01F 6/22; D01F 9/12; D01F 9/14
See application file for complete search history.

(56) References Cited

U.S. PATENT DOCUMENTS

| | | | |
|---|---|---|---|
| 4,935,180 A * | 6/1990 | Daumit | D01D 5/08 264/177.13 |
| 5,437,927 A | 8/1995 | Ross et al. | |

(Continued)

FOREIGN PATENT DOCUMENTS

| | | |
|---|---|---|
| JP | 02-160911 | 6/1990 |
| JP | 02-242918 | 9/1990 |

(Continued)

OTHER PUBLICATIONS

Honjo, Kuniaki, "Fracture toughness of PAN-based carbon fibers estimated from strength-mirror size relation," Carbon, vol. 41, Issue 5 (2003), pp. 979-984.*

(Continued)

*Primary Examiner* — Holly Rickman
*Assistant Examiner* — Lisa Chau
(74) *Attorney, Agent, or Firm* — DLA Piper LLP (US)

(57) ABSTRACT

A carbon fiber bundle includes single-fibers 40% or more of which have a quasi-oval cross section perpendicular to a fiber direction and meet both Equations (1) and (2): $1.03 \leq La/Lb \leq 1.20$ (1) and $1.05 \leq Ld/Lc \leq 1.25$ (2), wherein La is length of a long axis defined as a line segment connecting two points farthest away from each other on a circumference of the quasi-oval cross section of a single-fiber; Lb is length of a short axis defined as a line segment extending perpendicular to the long axis, passing through a midpoint of the long axis, and connecting two points on the circumference; and Lc and Ld are defined as length of a shorter one and that of a longer one, respectively.

7 Claims, 3 Drawing Sheets

(51) Int. Cl.
*D01F 9/14* (2006.01)
*C01B 32/00* (2017.01)
*D01F 6/22* (2006.01)

(56) References Cited

U.S. PATENT DOCUMENTS

2013/0274413 A1* 10/2013 Ozeki ................. B32B 5/12
                                                        524/611
2015/0094401 A1* 4/2015 Kiriyama ............. D01F 6/38
                                                        523/222

FOREIGN PATENT DOCUMENTS

| | | | |
|---|---|---|---|
| JP | 03-097918 A | | 4/1991 |
| JP | 04-202815 A | | 7/1992 |
| JP | 11-302916 A | | 11/1999 |
| JP | 2010037668 A | * | 2/2010 |
| JP | 2012-188766 A | | 10/2012 |
| JP | 2012188766 A | * | 10/2012 |
| WO | WO-2013157612 A1 | * | 10/2013 ............ C08K 7/06 |

OTHER PUBLICATIONS

Kuniaki Honjo, "Fracture toughness of PAN-based carbon fibers estimated from strength-mirror size relation," Carbon, vol. 41, Issue 5, pp. 979-984 (Abstract).

* cited by examiner

CARBON FIBER BUNDLE AND STABILIZED FIBER BUNDLE

TECHNICAL FIELD

This disclosure relates to a carbon fiber bundle comprising, as primary component, single-fibers having a specific cross-sectional shape to facilitate the analysis of factors in fracture and also relates to a stabilized fiber bundle useful for the production thereof.

BACKGROUND

High in specific strength and specific modulus, carbon fiber composite material has been in wide use in the fields of sports goods and aircraft industries and, in recent years, attempts at their application to automobile components are now increasingly active worldwide. Compared to mainly metal based conventional materials, carbon fiber composite material can serve to produce lightweight members while maintaining the same level of mechanical properties, which represents its greatest feature, but on the other hand, carbon fiber composite material is still relatively high in price, reflecting the price of carbon fiber used for its production. Thus, it has not yet completely replaced those conventional materials. It has been frequently pointed out that the relatively high price of carbon fiber can be attributed to the fact that it requires a complicated production process consisting of many steps. Large facility and utility costs are necessary because of complicated production processes consisting of many steps. In addition, if a defect is found in the carbon fiber produced, it will be difficult to identify the cause and a long period is usually required to identify the cause and solve the problem, leading to a decrease in the facility operation rate. Complicated effects of these factors on the production cost of carbon fiber cannot be ignored in the pricing of the resulting carbon fiber.

When a tensile strength of resin-impregnated strand of carbon fiber (hereinafter simply referred to as strand strength) is found to be low, all production steps are examined separately in many cases to check for abnormalities in each of them. Specifically, the management records of these steps are checked separately for abnormalities and forced deterioration testing is performed in many cases to identify major factors. These cause investigation processes often require much work and time. Analysis of the carbon fiber itself may also be performed in some cases. Also performed frequently is single-fiber tensile test. The strength distribution is examined and fracture surfaces of recovered test pieces are observed with the aim of identifying the cause of a decrease in strength. Being brittle, carbon fiber is known to suffer from break starting at defects such as foreign objects, flaws, and recesses, where stress concentration tends to occur, leaving characteristic marks in fracture surfaces. It is often possible to identify the positions of fracture origin from the marks left in fracture surfaces. Specifically, it has been reported that streams radially extending from one point may be found when observation is performed for fracture surfaces of carbon fiber single-fibers in a recovered fragment specimen, showing that the starting point of the radially extending streams represents the fracture origin (Carbon (Netherlands), 2003, 41, p. 979).

In general carbon fiber materials, such fracture origin and attributable defects are often found near the circumference of a single-fiber. The mechanism has not been completely clarified yet, and there are a variety of conceivable factors including the adhesion between single-fibers and abrasion with rollers in the spinning step, similar adhesion and contact with dust in the carbonization step, and electrochemical treatment in the surface treatment step. If observations of a fracture surface show that many fracture origin exist in internal parts, then the increase in the number of circumferential defects can be excluded from candidate factors, providing useful information in the investigation of causative factors.

If the shape of the cross section perpendicular to the fiber direction of a single-fiber (hereinafter occasionally referred to as cross-sectional shape) is not circular, it will be possible to examine the relative position of a fracture origin in the non-circular cross-sectional shape (if it is elliptic, for example, it means the degree of shift of the fracture origin from the intersection between the long axis and the circumference toward the short axis) to provide information about not only whether such points tend to exist either in internal parts or external parts, but also about whether they are distributed uniformly along the circumference or localized in a specific part. In a β like cross-sectional shape, for example, it is expected that the concave part tends to suffer less frequently from abrasion or contact, but suffer from the same level of influence compared to other parts when subjected to treatment such as electrolysis where it comes in contact with liquid. Therefore, if whether fracture origin are concentrated in the concave portion or distributed over the entire body is determined from observations of a fracture surface, it is expected that the observations serve to show whether abrasion/contact between single-fibers or with rollers or contact with fluid for electrochemical treatment should be suspected.

Although differing in the objective, some efforts deal with the control of the cross-sectional shape of carbon fiber or precursor fiber thereof. In Japanese Unexamined Patent Publication (Kokai) Nos. HEI 3-97918, HEI 4-202815 and HEI 11-302916, for example, carbon fiber with a triangular, trefoil, or H-shaped cross section is obtained by varying the arrangement or shape of spinneret holes. It has been disclosed that modified cross-sectional carbon fiber having such a non-circular cross section is high in adhesiveness to resin, bending strength, and compression strength. For a non-circular cross section, it is possible to determine the relative position of a fracture origin, but it is inferred, though not described clearly, that there may be problems with proccessability in the spinning stage or decrease in resin impregnatability in the composite formation stage. Japanese Unexamined Patent Publication (Kokai) No. 2012-188766, furthermore, has disclosed that acrylic fiber bundles containing single-fibers of a β-shape, elliptic, or circular cross section mixed at a specific ratio can have both a convergency and a spreadability. However, this essentially requires a spinneret of a complicated structure containing holes having a β-shape, elliptic, or circular cross section, and conditions should be set up to meet the cross-sectional shape with the lowest proccessability to ensure stable production of single-fibers largely varying in cross-sectional shape, resulting in difficulty in application to industrial processes.

It could therefore be helpful to provide a carbon fiber bundle and a stabilized fiber bundle comprising, as primary component, single-fibers having a quasi-oval cross-sectional shape for which the relative position of a fracture origin can be determined based on observations of the fracture surface of the single-fiber while maintaining the same level of strength and proccessability compared to fiber with a circular cross section.

SUMMARY

We found that a carbon fiber bundle in which 40% or more of the single-fibers contained have a quasi-oval cross-sectional shape perpendicular to the fiber direction and meets both Equations (1) and (2) serves effectively to provide excellent carbon fiber bundles:

$$1.03 \leq La/Lb \leq 1.20 \tag{1}$$

$$1.05 \leq Ld/Lc \leq 1.25 \tag{2}$$

La is the length of the long axis which is defined as the line segment connecting the two points farthest away from each other on the circumference of the quasi-oval cross section of a single-fiber while Lb is the length of the short axis which is defined as the line segment extending perpendicular to the long axis, passing through the midpoint of the long axis, and connecting two points on the circumference. In addition, when the long axis is divided into four equal parts to produce two line segments perpendicular to the long axis each of which passes through a point other than the midpoint of the long axis and connects two points on the circumference, Lc and Ld are defined as the length of the shorter one and that of the longer one, respectively.

A stabilized fiber bundle in which 70% or more of the single-fibers contained have a quasi-oval cross section perpendicular to the fiber direction can meet both Equations (1) and (2):

$$1.03 \leq La/Lb \leq 1.20 \tag{1}$$

$$1.05 \leq Ld/Lc \leq 1.25 \tag{2}$$

La is the length of the long axis which is defined as the line segment connecting the two points farthest away from each other on the circumference of the quasi-oval cross section of a single-fiber while Lb is the length of the short axis which is defined as the line segment extending perpendicular to the long axis, passing through the midpoint of the long axis, and connecting two points on the circumference. In addition, when the long axis is divided into four equal parts to produce two line segments perpendicular to the long axis each of which passes through a point other than the midpoint of the long axis and connects two points on the circumference, Lc and Ld are defined as the length of the shorter one and that of the longer one, respectively.

In our carbon fiber bundles and a carbon fiber bundle produced from a stabilized fiber bundle, determination of the relative position of a fracture origin in a single-fiber based on observations of the fracture surface is possible because of their quasi-oval cross-sectional shape, while the same level of strength and proccessability compared to those with circular cross sections are maintained. When an abnormal fall is found in the tensile strength of a carbon fiber bundle made as a manufactured product, the investigation of causes can be performed effectively to serve for reducing manufacturing opportunity losses attributable to a decrease in facility operation rate.

DETAILED DESCRIPTION

The carbon fiber bundle is a carbon fiber bundle in which 40% or more of the single-fibers contained have a quasi-oval cross section perpendicular to the fiber direction and meet both Equations (1) and (2):

$$1.03 \leq La/Lb \leq 1.20 \tag{1}$$

$$1.05 \leq Ld/Lc \leq 1.25 \tag{2}$$

La is the length of the long axis which is defined as the line segment connecting the two points farthest away from each other on the circumference of the quasi-oval cross section of the single-fiber while Lb is the length of the short axis which is defined as the line segment extending perpendicular to the long axis, passing through the midpoint of the long axis, and connecting two points on the circumference. In addition, when the long axis is divided into four equal parts to produce two line segments perpendicular to the long axis each of which passes through a point other than the midpoint of the long axis and connects two points on the circumference, Lc and Ld are defined as the length of the shorter one and that of the longer one, respectively.

The term "a cross section perpendicular to the fiber direction" refers not only to a cross section accurately perpendicular to the length direction of fiber, but also to others such as tensile fracture surface. Carbon fiber is a brittle material and tensile fracture surfaces tend to be nearly perpendicular to the fiber direction, allowing the above approximation. Furthermore, when referring to the shape of a cross section perpendicular to the fiber direction, it is not necessary, as a presupposition, for an accurately perpendicular cross section to exist actually as long as the cross section has a recognizable external shape when observed from the fiber direction.

A "quasi-oval shape" is a deformed circular shape that is flattened and asymmetric with respect to the short axis. The long axis is defined as the line segment connecting the two points farthest away from each other on the circumference while the short axis is defined as the line segment extending perpendicular to the long axis, passing through the midpoint of the long axis, and connecting two points on the circumference. Their lengths are referred to as La and Lb, respectively. If the shape is extremely close to a perfect circle for which it is impossible to identify a definite long axis, then an arbitrary line segment passing through the center of the shape and connecting two points on the circumference is assumed to be the long axis. Three points are required to divide the long axis into four equal parts, and for each of the two points other than the intersection between the long axis and the short axis, it is possible to draw a line segment that is perpendicular to the long axis and passes through the relevant quadrisecting point and two points on the circumference. Lc and Ld are defined as the length of the shorter one and that of the longer one, respectively. According to this definition, a circle represents a special case where La/Lb=Ld/Lc=1 and an ellipse represents a case where La/Lb is larger than 1 while Ld/Lc=1. In general, identification of their positions becomes easier as the degree of symmetry decreases. In a perfect circle, for example, it has a rotationally symmetric shape with respect to the center and any arbitrary point on the circumference cannot be distinguished from another point on the circumference. In an ellipse, an arbitrary point on the circumference cannot be distinguished from the point on the circumference identified by folding the shape along the long axis, another point on the circumference identified by folding the shape along the short axis, or still another point on the circumference identified by first folding the shape along the long axis and then folding it along the short axis. Accordingly, there exist four equivalent points. In a quasi-oval shape, there are no limitations on its symmetry though it may be line-symmetric with respect to the long axis, and the degree of symmetry of a quasi-oval shape is lower than that of a circle or ellipse. Thus, if a cross section has a circular shape, it is impossible to obtain useful information for determining factors in fracture such as about whether the relative positions of fracture origin are localized in a specific area or distributed uniformly. Compared to this, as the degree of symmetry decreases, the number of equivalent points to one arbitrary point on the circumference decreases and the classification of the relative positions of fracture origin becomes easier, probably serving effectively for identification of factors in fracture. The term "relative position of a fracture origin" refers to the position of the fracture origin relative to the shape of the cross section such as the existence of the fracture origin at the top of the quasi-oval shape of the quasi-oval cross section or its existence at an angle of 45 degrees from the top of the quasi-oval shape with respect to the intersection between the long axis and the short axis. When halving the long axis at the midpoint, the end of that half which contains the quadrisecting point that gives Lc is referred to as the top of the quasi-oval shape. A circle or an ellipse may be only nearly circular or nearly elliptic since it is rarely the case that an actual single-fiber has a cross-sectional shape that meets the mathematically accurate definition of a circle or ellipse.

Figure 4:
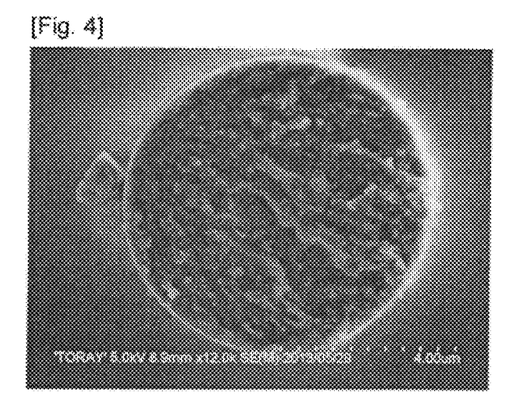
FIG. 4 is a SEM photograph of a tensile fracture surface of a single-fiber of carbon fiber in which La/Lb=1.03 and Ld/Lc=1.03 (corresponding to Comparative Example).

Equation (1) gives a requirement for the ratio between the length of the long axis La and that of the short axis Lb. The shape is circular when La/Lb=1 and it is flattened as the ratio increases. Equation (2) represents the deformation from an ellipse. The shape is elliptic when Ld/Lc=1, and as the ratio increases, the distance between the midpoint of the long axis and the center of gravity increases, leading to a higher degree of asymmetry. For the lower limit of La/Lb and Ld/Lc, results of repeated experiments show that if La/Lb is 1.03 or more, the non-circular feature can be identified visually in an enlarged photograph, allowing the determination of the long axis. Results also showed that if Ld/Lc is 1.05 or more, the shape does not appear to be elliptic and the top of the quasi-oval shape can be identified from visual observation. Accordingly, it can be assumed that the relative positions of fracture origin can be classified easily if these parameters are greater than the above values. FIG. 4 shows a SEM image of a carbon fiber single-fiber with a La/Lb ratio of 1.03 and a Ld/Lc ratio of 1.03. It is seen that in this example, the cross-sectional shape can be identified as an ellipse, but it is impossible to determine visually which end is the top of the quasi-oval shape. If the values of La/Lb and Ld/Lc are too large, on the other hand, the tensile strength of the single-fiber decreases and the overall strand strength tends to deteriorate. But the decrease in strand strength is undetectable or ignorable as compared to circular sections, if the La/Lb and Ld/Lc ratios are 1.20 or less and 1.25 or less, respectively. This cross-sectional shape can be controlled mainly by modifying the spinneret properly as described later.

Those single-fibers that meet both Equation (1) and (2) should account for at least a certain proportion to allow effective classification of the relative positions of fracture origin while preventing a significant decrease in strand strength. If the proportion is too small, there may be too many single-fibers having a circular cross-sectional shape in which the relative positions of fracture origin cannot be determined. If those single-fibers that meet both Equation (1) and (2) account for 40% or more, there will be no significant decrease in strand strength and the relative positions of fracture origin in the quasi-oval cross section can be determined efficiently. This proportion should be as high as possible and it is more preferably 50% or more, still more preferably 60% or more, particularly preferably 70% or more, and most preferably 100%. This proportion can be controlled mainly by varying the concentration conditions of the coagulation bath and the distance through which the spinning solution passes after being extruded from the spinneret in a dry-wet spinning process.

The carbon fiber bundle should preferably be such that 40% or more of the single-fibers contained have a quasi-oval cross section perpendicular to the fiber direction and meet both Equations (3) and (4):

$$1.04 \leq La/Lb \leq 1.17 \qquad (3)$$

$$1.05 \leq Ld/Lc \leq \qquad (4).$$

A La/Lb ratio of 1.04 or more is more preferable because it will be easier to determine that the shape is not circular while it is more preferable that the La/Lb ratio is 1.17 or less and that the Ld/Lc ratio is 1.20 or less because the decrease in strand strength can be further depressed.

The average of La/Lb and that of Ld/Lc of the single-fibers in a carbon fiber bundle is referred to as <La/Lb> and <Ld/Lc>, respectively. The calculation of these averages is performed based on measurements for 100 single-fibers randomly sampled from a carbon fiber bundle. If a carbon fiber bundle contains only 400 or less single-fibers, 25% of the single-fibers are sampled for measurement. Detailed evaluation procedures will be described in Examples. Equation (5) gives a requirement for <La/Lb>, i.e., the average of La/Lb, of the single-fibers in a carbon fiber bundle, and a larger value of <La/Lb> means a larger number of flattened single-fibers. Equation (6) gives a requirement for <Ld/Lc>, i.e., the average of Ld/Lc, of the single-fibers in a carbon fiber bundle, and a larger value of <Ld/Lc> means a larger distance between the midpoint of the long axis and the center of gravity, suggesting a larger number of highly asymmetric single-fibers. Even if those single-fibers that meet both Equation (1) and (2) account for 40% or more, other single-fibers may have a cross section with a concave part such as β-shape or multilobar, and such single-fibers may be relatively low in tensile strength, possibly resulting in carbon fiber bundles containing increased fuzzing and pilling to cause quality deterioration. Therefore, it is preferable that both requirements of a <La/Lb> of 1.20 or less and a <Ld/Lc> of 1.20 or less be met simultaneously.

The cross-sectional shape parameters of La, Lb, Lc, and Ld are determined from observations of a cross section of the single-fibers. Their determination can be carried out from observations of tensile fracture surfaces and polished cross sections by optical microscopy, scanning electron microscopy, or transmission electron microscopy. To determine these parameters, it is necessary for the resolution to be at least 0.2% of the length of the object being examined and accordingly, an electron microscope is required for a cross section having, for example, a short axis of 5 μm. Detailed determination procedures will be described in Examples. It should be noted that if a single-fiber sampled as described above has a small dent or crack of 100 nm or more in the circumference such a single-fiber should not be used for the measurement and another single-fiber should be sampled randomly for use.

Furthermore, the single-fibers preferably have a surface area ratio of 1.00 to 1.10, more preferably 1.00 to 1.06, as measured by atomic force microscopy according to the procedure described later. The above-mentioned surface area ratio is defined as the ratio of the projected area to the actual area of the surface of carbon fiber and this ratio represents the degree of roughness of the surface. A surface area ratio closer to 1 means a higher degree of smoothness, which tends to be advantageous to produce carbon fiber with improved tensile strength. The lower limit of the surface area ratio is 1.00 from definition and should be controlled in the range of 1.00 to 1.10 because the decrease in strength that may occur due to variations in surface wrinkles is small when it is 1.10 or less. The above-mentioned surface area ratio depends on the methods used for spinning and coagulation. The dry-wet spinning process, for example, tends to give a smooth surface. In the coagulation process, a thin skin layer will be formed and fibrils will be exposed at the surface when the coagulation speed is decreased by, for example, increasing the solvent concentration of the coagulation bath whereas enlarging the coagulation morphology by, for example, raising the coagulation temperature will lead to larger fibrils and a rougher surface.

In general, single-fibers with a smaller diameter tend to realize improved mechanical properties, particularly a higher tensile strength, though possibly leading to a decrease in productivity. In single-fibers with a large diameter, on the other hand, the productivity will be high, but the use of polyacrylonitrile fiber, for example, as precursor fiber will lead to a skin-core structure within the single-fibers as a result of slow diffusion of oxygen from surface into the internal part of the fiber in each precursor single-fiber in the precursor fiber bundle mainly in the stabilization step, possibly leading to deterioration in mechanical properties. Because of the existence of this tradeoff, it is preferable for these carbon fiber single-fibers to have an average diameter of 4 to 7 μm. The average diameter of single-fibers corresponds to the diameter of a circle having the equal area, which is calculated to allow comparison among many cross-sectional shapes including non-circular ones. Detailed determination procedures will be described in Examples.

Furthermore, the carbon fiber bundle preferably has a strand strength of 5.0 GPa or more and a resin impregnated strand tensile modulus (hereinafter also referred to as strand elastic modulus) of 230 GPa or more simultaneously. For the carbon fiber bundle, a higher strand strength and a higher strand elastic modulus are more preferable because the carbon fiber reinforced composite material produced therefrom will have better properties. The strand strength is more preferably 5.8 GPa or more and still more preferably 6.2 GPa or more. The strand elastic modulus is more preferably 260 GPa or more and more preferably 300 GPa or more.

It is preferable for the carbon fiber bundle to be produced by carbonizing a stabilized fiber bundle in which 70% or more of the single-fibers contained have a quasi-oval cross section perpendicular to the fiber direction and meet both Equations (1) and (2). Accordingly, such a stabilized fiber bundle is also preferred.

As described in the "Background" section, carbon fiber is brittle and accordingly sensitive to defects, and in many cases, observation of a fracture surface allows the locations of defects to be determined as fracture origin. Observation of a fracture surface allows the determination of the relative position of a fracture origin, i.e., defect attributable to fracture, which was impossible in conventional carbon fiber with a circular cross section. There are many factors in the generation of defects and many of them remain unclarified. To give an example, we found that the distribution of the positions of fracture origin, for example, can vary largely in some cases depending on the carbon fiber production conditions, as described in Examples. In Examples, the tension during steam stretching in the spinning step is varied and results show that many of the fracture origin are located close to the top of the quasi-oval shape as the tension is decreased, whereas under common conditions, they are uniformly distributed along the circumference of fiber. The reason for the fact that defects tend to concentrate close to the top of the quasi-oval shape has not been fully clarified yet, but it is considered that a decrease in tension during steam stretching works to increase the amplitude and speed of vibrations of single-fibers in the steam stretching tube and defects can result from the contact or abrasion of single-fibers with other single-fibers or with the inner wall of the tube. It is inferred that in this instance, defects were produced more easily in the vicinity of the top of the quasi-oval shape, which is farther away from the center of gravity of the single-fibers, but as seen from Examples, the same degree of slight decrease in strand strength occurred even in the case of a circular cross-sectional shape, indicating that the total increase of defects did not depend on the cross-sectional shape. This suggests that the difficulty in the generation of defects at positions away from the top of the quasi-oval shape led to the relatively large number of fracture origin in the vicinity of the top of the quasi-oval shape. This is a novel viewpoint and more investigation is required to clarify the effects of steps other than the steam stretching step. What is important here is the fact that such analysis as above relating to the positions of defects is theoretically impossible in the case of conventional carbon fiber with a circular cross section.

Explained below is a production method for a precursor fiber bundle for carbon fiber suitable to produce. Suitable precursors for producing a precursor fiber bundle for carbon fiber include polyacrylonitrile polymers, cellulose polymers, isotropic pitch, anisotropic pitch, polyimide compounds, polyamic acid compounds, and other precursor generally known to be suitable for producing precursor fiber for carbon fiber, from which an appropriate one may be selected, but the use of a polyacrylonitrile polymer as precursor is preferable mainly from the viewpoint of development of physical properties. The term "polyacrylonitrile polymer" refers to a material in which acrylonitrile is at least the main component of the polymer unit and that the term "main component" commonly refers to the component that accounts for 90 to 100 mol % of the polymer unit.

It is preferable for the polyacrylonitrile polymer to contain a copolymer component from the viewpoint of improving the spinnability and efficiently carrying out stabilization treatment.

An appropriate one may be selected from among the generally known polymerization methods as a production method for the polyacrylonitrile polymer. The spinning dope to be used is prepared by dissolving the aforementioned polyacrylonitrile polymer in a solvent such as dimethyl sulfoxide, dimethyl formamide, and dimethyl acetamide that can dissolve polyacrylonitrile. In the spinning dope, the concentration of the polyacrylonitrile polymer is preferably 10 to 23 mass % from the viewpoint of controlling the carbon fiber cross-sectional shape.

Described below is a production method for a precursor fiber bundle for carbon fiber suitable to produce the carbon fiber bundle.

Either the dry-wet spinning technique or the wet spinning technique may be used as a spinning method, but the use of the dry-wet spinning is preferable because of being high in production stability, ensuring good mechanical properties of the resulting carbon fiber bundle, and having the advantage of a high degree of proccessability. The spinning process may comprise a spinning step in which the dry-wet spinning technique is performed to spin fiber by extruding the spinning dope through a spinning spinneret, a rinsing step in which the fiber resulting from the spinning step is washed in a water bath, a water bath stretching step in which the fiber resulting from the rinsing step is stretched in a water bath, and a dry heat treatment step in which the fiber resulting from the water bath stretching step is treated in dry heat, and may also include a steam stretching step in which the fiber resulting from the dry heat treatment step is subjected to steam stretching.

It is preferable for the coagulation bath to contain the same solvent used in the spinning dope such as dimethyl sulfoxide, dimethyl formamide, and dimethyl acetamide, and a so-called coagulation accelerating agent. The coagulation accelerating agent used should not be able to dissolve the aforementioned polyacrylonitrile polymer and should be compatible with the solvent used in the spinning solution. Specifically, it is preferable to use water as the coagulation accelerating agent. A higher solvent concentration in the coagulation bath acts to lower the coagulation speed and more easily leads to a quasi-oval cross-sectional shape.

Figure 1:
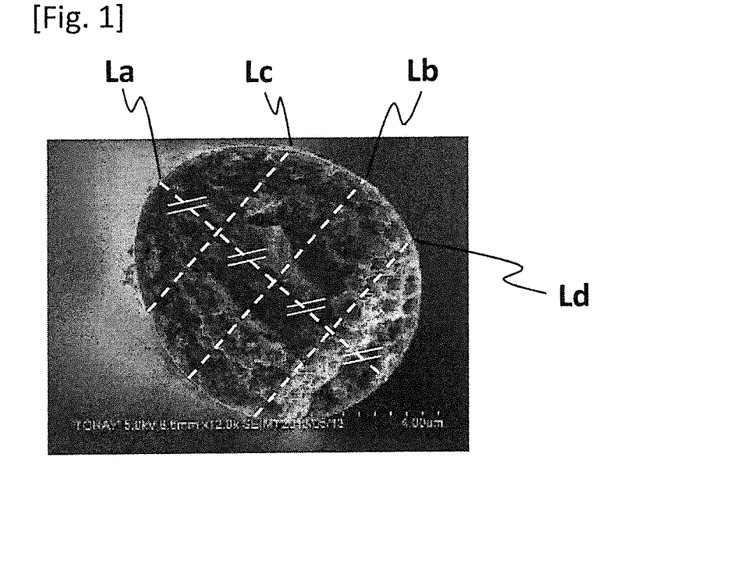
FIG. 1 is a SEM photograph of a tensile fracture surface of a single-fiber of carbon fiber.
Figure 2:
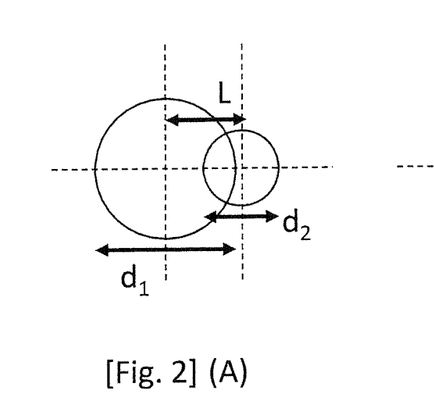
FIGS. 2(A) and 2(B) show preferred typical spinneret holes.
Figure 3:
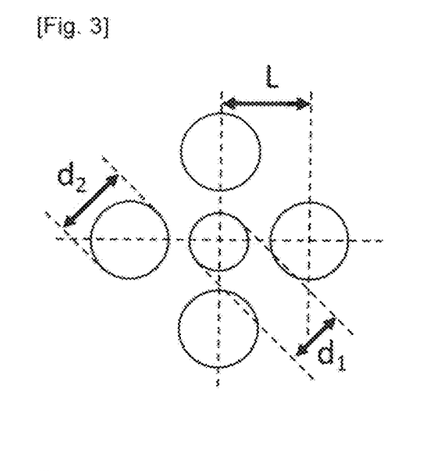
FIG. 3 shows typical not preferred spinneret holes.

Precursor fiber suitable for carbon fiber to produce carbon fiber with a quasi-oval cross-sectional shape can be manufactured by appropriately adjusting the shape of the spinneret hole. It may be effective to use a spinneret hole having a quasi-oval cross-sectional shape similar to that of the desired single-fiber, but when the dry-wet spinning technique is adopted in the spinning process, two or more holes arranged close to each other may be used so that the extruded polymer flows will be easily unified as they pass through the air gap. This is preferable because a single-fiber with a controlled quasi-oval cross-sectional shape can be obtained only by combining circular holes that can be processed at relatively low cost. The shape of the spinneret holes can be controlled based on trial-and-error testing, but, for example, preferable ones include those shown in FIGS. 2(A) and 2(B). However, they should not be construed as limiting the shape of spinneret holes. When one coagulated single-fiber is produced from a group of two or more closely adjacent holes, the group of holes is assumed to be acting as one spinneret hole. It is preferable for a spinneret hole to have a cross section of 0.002 to 0.1 mm$^2$ to produce carbon fiber with a small single-fiber fineness that is advantageous for the development of mechanical properties. Commonly, single-fibers formed through several holes tend to vary in cross-sectional shape, but it is easy to adjust the intervals, number, and arrangement of the holes to ensure a desired cross-sectional shape and a desired proportion of the single-fibers with that shape.

The length of the passage along which the spinning solution passes through the space after being extruded from the spinneret in the dry-wet spinning step may be varied so that the proportion of single-fibers that meet both of Equations (1) and (2) is controlled above a certain value. Specifically, as this length is increased, a larger proportion of single-fibers will have a circular cross-sectional shape. The length is preferably controlled at several millimeters.

It is preferable for the rinsing step to use a water bath that comprises a plurality of stages for rinsing at a temperature of 20° C. to 90° C.

The stretch ratio in the water bath stretching step is preferably 1.3 to 5, more preferably 2 to 4.

After the water bath stretched step, it is preferable for the fiber to be provided with an oil agent containing, for example, silicone to prevent adhesion between single-fibers. Such a silicone oil agent preferably contains modified silicone, which is preferably amino-modified silicone having high heat resistance.

For the dry heat treatment step, a generally known method may be selected appropriately. For example, the drying temperature may be 70° C. to 200° C.

After carrying out the aforementioned rinsing step, water bath stretching step, oil agent treatment step, and dry heat treatment step that uses a generally known method, steam stretching is performed if required, thereby providing a precursor fiber bundle for carbon fiber suitable to produce the carbon fiber bundle. The steam stretching step preferably comprises stretching of at least 3 or more times, more preferably 4 or more times, still more preferably 5 or more times, in pressurized steam.

Described next is a production method to obtain the carbon fiber bundle.

The carbon fiber bundles can be produced by subjecting the aforementioned precursor fiber bundle for carbon fiber to stabilization treatment, preliminary carbonization, and carbonization. The stabilization treatment of a precursor fiber bundle for carbon fiber is preferably performed at a highest possible temperature where a runaway reaction does not occur and, specifically, it is preferably performed in air at 200° C. to 300° C. To obtain carbon fiber with improved mechanical properties, duration of the stabilization treatment is preferably such that the resulting stabilized fiber has a specific gravity of 1.3 to 1.4.

The aforementioned stabilization treatment is followed by preliminary carbonization. In the preliminary carbonization step, it is preferable for the resulting stabilized fiber to be subjected to heat treatment in an inert atmosphere at a maximum temperature of 500° C. to 1,200° C. until the specific gravity reaches 1.5 to 1.8.

The aforementioned preliminary carbonization is followed by carbonization. It is preferable for the resulting preliminary carbonized fiber bundle to be subjected to carbonization in an inert atmosphere at a maximum temperature of 1,200° C. to 2,000° C. For the carbon fiber bundle production, the temperature of the carbonization step is preferably as high as possible from the viewpoint of obtaining carbon fiber with a high strand elastic modulus, but an excessively high temperature can result in a decrease in the strength in the high strength region. Therefore, both of these should be taken into account when setting the temperature. The temperature is more preferably 1,200° C. to 1,800° C. and still more preferably 1,200° C. to 1,600° C.

In the carbonization step, furthermore, the fiber bundle is preferably in a substantially untwisted state. A fiber bundle in a substantially untwisted state has a twist, if any, of one turn or less per meter of the fiber bundle.

The carbonization step may be followed by graphitization in an inert atmosphere at a maximum temperature of 2,000° C. to 3,000° C. The temperature of the graphitization step is preferably as high as possible from the viewpoint of ensuring a high strand elastic modulus, but a high temperature may lead to a decrease in strand strength and, therefore, it is set appropriately to ensure a good balance among desired physical properties.

The carbon fiber bundle resulting from the above steps is subjected to oxidation treatment to introduce an oxygen-containing functional group so that the adhesiveness to matrix resin will be improved. Useful oxidation treatment methods include gas phase oxidation, liquid phase oxidation, and liquid phase electrochemical oxidation, of which liquid phase electrochemical oxidation has been preferred from the viewpoint of high productivity and uniform treatment. There are no specific limitations on the technique to be used for liquid phase electrochemical oxidation and a generally known one may be selected appropriately.

Such electrochemical treatment may be followed by sizing treatment to allow the resulting carbon fiber bundle to have high bundling capability. For the sizing step, a sizing agent with a high compatibility with the matrix resin is selected appropriately taking the type of the matrix resin used in the composite material into consideration.

EXAMPLES

Our bundles and method will now be illustrated in more detail with reference to examples, but it should be understood that this disclosure is not construed as being limited to the examples.

Weight Average Molecular Weight Mw and Polydispersity Mz/Mw

The polymer to be examined is dissolved in dimethyl formamide (0.01N lithium bromide added) to a concentration of 0.1 mass % to prepare a specimen solution. When precursor fiber is to be examined, the precursor fiber should be dissolved in a solvent to prepare such a specimen solution as described above. Precursor fiber, however, is more difficult to dissolve as it is more highly oriented and higher in denseness. Therefore, its measured molecular weight tends to be lower as the dissolution time is increased and the dissolution temperature raised. Thus, precursor fiber was pulverized and put in a solvent with a controlled temperature of 40° C., followed by stirring with a stirrer for one day to ensure dissolution. The resulting specimen solution was subjected to GPC and a molecular weight distribution curve was prepared from a GPC curve obtained under the following conditions, followed by calculation of Mw and Z-average molecular weight Mz. Then, Mz/Mw was calculated from the values of Mw and Mz obtained above.

column: polarity organic solvent type GPC column
  flow rate: 0.5 ml/min
  temperature: 75° C.
  specimen filtration: membrane filter (0.45 µm cut)
  injection rate: 200 µl
  detector: differential refractometer Mw and Mz are polystyrene based values calculated from the elution time using an elution time—molecular weight calibration curve prepared by the ordinary method using a monodisperse polystyrene standard sample having a known molecular weight. The calibration curve was based on a cubic function.

For the examples given below, the GPC equipment used was CLASS-LC2010 supplied by Shimadzu Corporation, with two TSK-GEL-α-M columns supplied by Tosoh Corporation and TSK-guard Column a supplied by Tosoh Corporation. Also used were products of dimethyl formamide and lithium bromide supplied by Wako Pure Chemical Industries, Ltd., a 0.45 µm FHLP FILTER membrane filter supplied by Millipore Corporation, a RID-10AV differential refractometer supplied by Shimadzu Corporation, and monodisperse polystyrene standard samples for calibration curve preparation having a molecular weight of (1) 184,000, (2) 427,000, (3) 791,000, (4) 1,300,000, (5) 1,810,000, or (6) 4,210,000.

Resin-Impregnated Strand Tensile Strength and Resin-Impregnated Strand Tensile Modulus of Carbon Fiber Bundle The resin-impregnated strand tensile strength and resin-impregnated strand tensile modulus of a carbon fiber bundle were determined by the following procedure according to JIS R7608 (2007) "Resin impregnated strand test method." A resin-impregnated strand of the carbon fiber bundle to be examined was prepared by impregnating carbon fiber or graphitized fiber with a mixture of 3,4-epoxycyclohexylmethyl-3,4-epoxycyclohexyl carboxylate (100 parts by mass), boron trifluoride monoethyl amine (3 parts by mass), and acetone (4 parts by mass), followed by curing for 30 minutes at a temperature of 125° C. Measurements were taken for six resin-impregnated strands of carbon fiber and the measurement results were averaged to determine the resin-impregnated strand tensile strength. Furthermore, the range of strain to calculate the resin-impregnated strand tensile modulus was 0.3% to 0.7% for a carbon fiber bundle produced from a precursor fiber bundle with a single-fiber fineness of 1.0 dtex and 0.45% to 0.85% for a carbon fiber bundle produced from precursor fiber with a single-fiber fineness of 0.7 dtex, and the resin-impregnated strand tensile modulus was calculated from the inclination of the stress-strain curve, which was assumed to be a straight line, in the strain range. For these examples, 3,4-epoxycyclohexylmethyl-3,4-epoxycyclohexyl carboxylate used was Celloxide (registered trademark) 2021P supplied by Daicel Chemical Industries, Ltd.

Average Diameter of Single-Fibers

For a carbon fiber bundle consisting of many single-fibers to be examined, the mass Af (g/m) per unit length and specific gravity Bf (–) were determined. The average diameter (µm) of the single-fibers was calculated by the following equation where Cf represents the number of filaments contained in the carbon fiber bundle examined. In the following equation, the value of specific gravity Bf is used as approximation of the density (g/cm$^3$):

$$\text{Average diameter of single-fibers}(\mu m) = (Af/Bf/Cf\pi)^{1/2} \times 2 \times 10^3.$$

Cross-Sectional Shape of Single-Fiber (La/Lb, Ld/Lc)

A single-fiber was sampled from a carbon fiber bundle and fractured by pulling it in the fiber axis direction. Two pieces of fiber were obtained from one sample as a result of the fracture. One of them was discarded and the other pasted, with the fracture surface up, on the SEM specimen table using carbon tape. This operation was repeated 25 times to prepare a SEM specimen consisting of 25 single-fibers pasted, with the fracture surfaces up, on the SEM specimen table. For stabilized fiber, a bundle of about 100 single-fibers was sampled and frozen by immersion in liquid nitrogen for about 20 seconds and, after taking it out, clipped off to expose the cross section. This stabilized fiber bundle was pasted, with the cross section up, on the SEM specimen table using carbon tape. In any case, platinum palladium was vacuum-deposited to a thickness of about 10 nm and observation was performed using a S-4800 scanning electron microscope (SEM) supplied by Hitachi High-Technologies Corporation under the conditions of an accelerating voltage of 5.0 kV and a working distance of 8 mm.

The values relating to the cross-sectional shape were determined as described below for the 25 single-fibers of carbon fiber. For stabilized fiber, 25 single-fibers with the cross sections perpendicular to the fiber direction were selected based on SEM observations.

(a) Determination of Long Axis

The long axis was determined from SEM observations of the fracture surface. In this instance, the long axis was assumed to be the longest straight line connecting two arbitrary points on the circumference of the fracture surface. Such observations are performed visually and, therefore, the angle of the long axis determined can fluctuate slightly among different measurers or among measuring runs performed by one measurer. We found, however, that the fluctuation due to such factors was a small ±10 degree or so at maximum and accordingly, the average of measurements taken in two consecutive measuring runs performed by one measurer was adopted.

(b) Measurement of La, Lb, Lc, and Ld

Open source image analysis software, ImageJ ver. 1.47, was used for their measurement. The length La of the long axis was determined by measuring the length of the long axis determined in paragraph (a) in terms of the number of pixels and converting it into an actual length (in µm) using a scale bar given in the SEM observation image. Then, three points that divide the long axis into four equal parts were located, followed by drawing three line segments that connect two points on the circumference of the fiber and extend perpendicular to the long axis. Of these, the one passing through the midpoint of long axis was defined as the short axis and the length Lb of the short axis was determined by the same procedure as for La. The lengths of the two remaining line segments were also determined by the same procedure as for La, and the length of the shorter one and that of the longer one were named Lc and Ld, respectively.

From these measurements, the values of La/Lb and Ld/Lc were calculated for 25 single-fibers. For each single-fiber, we examined whether both Equation (1) and Equation (2) were met or both Equation (3) and Equation (4) were met and for each case, the number of single-fibers that meet both equations was divided by 25, i.e., the total number of sampled single-fibers, to determine the ratio.

$$1.03 \leq La/Lb \leq 1.20 \quad (1)$$

$$1.05 \leq Ld/Lc \leq 1.25 \quad (2)$$

$$1.04 \leq La/Lb \leq 1.17 \quad (3)$$

$$1.05 \leq Ld/Lc \leq 1.20 \quad (4).$$

Average Values (<La/Lb> and <Ld/Lc>) Defining the Cross-Sectional Shape

From the values of La/Lb and Ld/Lc obtained as described above for 25 single-fibers, their arithmetic averages were calculated to provide <La/Lb> and <Ld/Lc>. Furthermore, the averages of La/Lb and Ld/Lc were calculated for only those single-fibers which meet Equation (1) and Equation (2).

Surface Area Ratio of Single-Fiber in Carbon Fiber Bundle

Several precursor fiber single-fibers under evaluation were put on the specimen stub and both ends were fixed with an adhesive liquid (for example, correction fluid for stationery use) to prepare a specimen, followed by recording a three dimensional surface profile using an atomic force microscope (SPI3800N/SPA-400, supplied by Seiko Instruments Inc.) under the following conditions:
  probe: silicon cantilever (DF-20, supplied by Seiko Instruments Inc.)
  measuring mode: dynamic force mode (DFM)
  scanning speed: 1.5 Hz
  scanning range: 3 µm×3 µm
  resolution: 256 pixels×256 pixels.

Considering the curvature of the fiber cross section, the observed image thus obtained was examined by performing fitting based on the first-order plane determined by the least square method from the entire data of the image using the attached software, followed by first-order inclination correction for correcting the in-plane inclination and second-order inclination correction for correcting the second-order curve performed in a similar way. Then, using the attached software, the surface roughness was analyzed and the surface area ratio was calculated. Three different single-fibers were randomly sampled and a total of three measurements were obtained by taking one measurement for each of the single-fibers, followed by averaging them to determine the surface area ratio.

Spinneret
  [A] Spinneret A: Spinneret A is of the type shown in FIG. 2(B) and contains 100 pairs of holes, each pair consisting of one circular hole with a diameter (d1) of 0.2 mm and one circular hole with a diameter (d2) of 0.06 mm that are spaced with a center-to-center distance (L) of 0.16 mm.
  [B] Spinneret B: Spinneret B is of the type shown in FIG. 2(B) and contains 100 pairs of holes, each pair consisting of one circular hole with a diameter (d1) of 0.2 mm and one circular hole with a diameter (d2) of 0.06 mm that are spaced with a center-to-center distance (L) of 0.18 mm.
  [C] Spinneret C: Spinneret C is of the type shown in FIG. 2(B) and contains 100 pairs of holes, each pair consisting of one circular hole with a diameter (d1) of 0.3 mm and one circular hole with a diameter (d2) of 0.06 mm that are spaced with a center-to-center distance (L) of 0.22 mm.
  [D] Spinneret D: Spinneret D is of the type shown in FIG. 2(B) and contains 100 pairs of holes, each pair consisting of one circular hole with a diameter (d1) of 0.3 mm and one circular hole with a diameter (d2) of 0.04 mm that are spaced with a center-to-center distance (L) of 0.20 mm.
  [E] Spinneret E: Spinneret E has 100 circular holes with a diameter of 0.2 mm.

Example 1

A copolymer consisting of 99.5 mol % of acrylonitrile and 0.5 mol % of itaconic acid was polymerized by solution polymerization using dimethyl sulfoxide as solvent and 2,2'-azobisisobutyronitrile as initiator to produce a polyacrylonitrile copolymer with a weight average molecular weight of 400,000 and a Mz/Mw ratio of 2.1. Ammonia gas was blown into the resulting polyacrylonitrile polymer to adjust the pH value to 8.5 and the concentration of the polymer was adjusted to 19 mass % to prepare a spinning solution. A coagulated fibers was produced through a dry-wet spinning process in which the resulting spinning solution was extruded from Spinneret A at 40° C. first into air, then allowed to pass through a space of about 5 mm, and introduced into a coagulation bath of a 79% aqueous solution of dimethyl sulfoxide controlled at 5° C. This coagulated fibers was rinsed by an ordinary method and stretched 3.5 times in a double-tank warm water bath. Subsequently, this fiber bundle stretched in a water bath was treated with a silicone oil agent composed mainly of amino-modified silicone and dried/densified using heated rollers at 160° C. Five bundles of such fibers were gathered to prepare a fiber bundle consisting of 500 single-fibers and stretched 3.7 times under a tension of 500 g in pressurized steam, thereby providing a polyacrylonitrile based precursor fiber bundle featuring a total spinning draw ratio of 13, having a single-fiber fineness of 1.0 dtex, and consisting of 500 single-fibers. The spinning solution was able to pass through the spinning process without significant problems.

Subsequently, it was subjected to stabilization treatment while stretching with a stretch ratio of 1 in air at temperature of 240° C. to 260° C. to provide a stabilized fiber bundle with a specific gravity of 1.35 to 1.36. The resulting stabilized fiber bundle was subjected to preliminary carbonization treatment while stretching with a stretch ratio of 1.15 in a nitrogen atmosphere at a temperature of 300° C. to 800° C. to provide a preliminary carbonized fiber bundle. The resulting preliminary carbonized fiber bundle was subjected to carbonization treatment under a tension of 2.5 mN/dtex in a nitrogen atmosphere at a maximum temperature of 1300° C. to provide a carbon fiber bundle.

Figure 5:
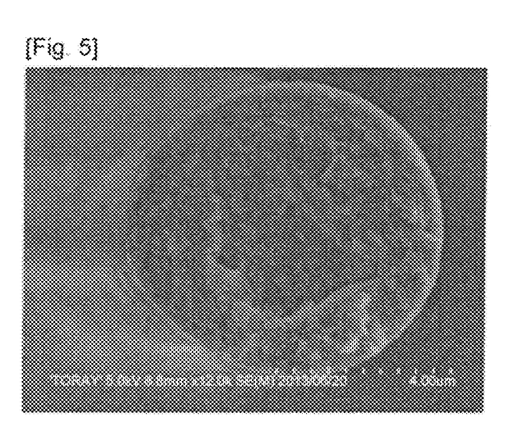
FIG. 5 is a SEM photograph of a tensile fracture surface of a single-fiber of carbon fiber prepared in Example 1.
Figure 7:
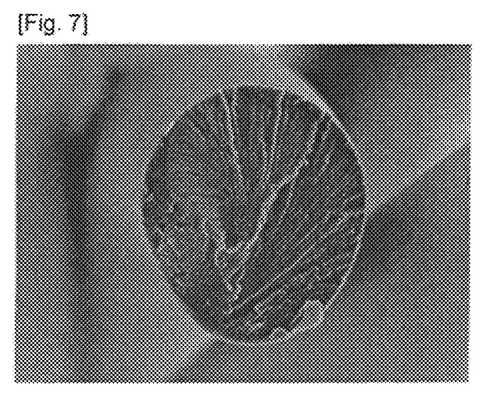
FIG. 7 is a SEM photograph of a tensile fracture surface of a single-fiber of a stabilized fiber prepared in Example 1.

The resulting carbon fiber bundle was subjected to evaluation to determine its specific gravity, average diameter, strand strength, strand elastic modulus, cross-sectional shape, and surface area ratio. Evaluation results are given in Table 1 and a SEM photograph of its cross section is shown in FIG. 5. The cross-sectional shape of the stabilized fiber bundle was also evaluated. A SEM photograph of its cross section is shown in FIG. 7 and evaluation results are given in Table 2.

Example 2

Figure 6:
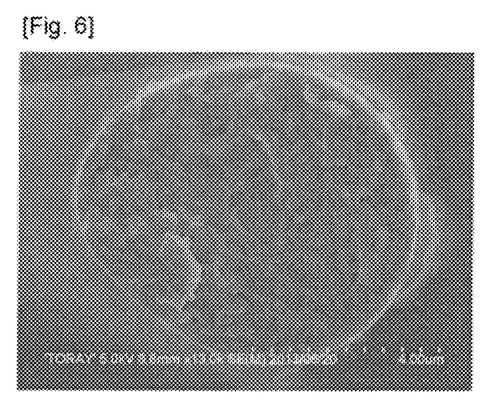
FIG. 6 is a SEM photograph of a tensile fracture surface of a single-fiber of carbon fiber prepared in Example 2.

Except for using Spinneret B and allowing the spinning solution extruded from the spinneret to pass through a space of about 4 mm, the same procedure as in Example 1 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1 and a SEM photograph of its cross section is shown in FIG. 6. The cross-sectional shape of the stabilized fiber bundle was also evaluated. Evaluation results are given in Table 2.

Example 3

Except for using a precursor fiber bundle with a single-fiber fineness of 0.7 dtex, the same procedure as in Example 1 was carried out to produce a polyacrylonitrile based precursor fiber bundle. The spinning solution was able to pass through the spinning process without significant problems. Except for performing carbonization treatment below a maximum temperature of 1,500° C. under a tension of 3.5 mN/dtex, the same procedure as in Example 1 was carried out to produce a carbon fiber bundle. Evaluation results are given in Table 1.

Example 4

Except for using Spinneret C, allowing the spinning solution extruded from the spinneret to pass through a space of about 4 mm, and using a precursor fiber bundle with a single-fiber fineness of 0.7 dtex, the same procedure as in Example 1 was carried out to produce a polyacrylonitrile based precursor fiber bundle. The spinning solution was able to pass through the spinning process without significant problems. Except for performing carbonization treatment below a maximum temperature of 1,500° C. under a tension of 5.2 mN/dtex, the same procedure as in Example 1 was carried out to produce a carbon fiber bundle. Evaluation results are given in Table 1.

Comparative Example 1

Except for using Spinneret E, allowing the spinning solution extruded from the spinneret to pass through a space of about 4 mm, and using a coagulation bath containing a 30% aqueous solution of dimethyl sulfoxide controlled at 15° C., and using a precursor fiber bundle with a single-fiber fineness of 0.7 dtex, the same procedure as in Example 1 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1.

Comparative Example 2

Except for using a precursor fiber bundle with a single-fiber fineness of 1.0 dtex, the same procedure as in Comparative example 1 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1. The cross-sectional shape of the stabilized fiber bundle was also evaluated. Evaluation results are given in Table 2.

Comparative Example 3

Except for using a coagulation bath containing a 55% aqueous solution of dimethyl sulfoxide controlled at 30° C., the same procedure as in Comparative example 2 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1.

Comparative Example 4

Except for allowing the spinning solution extruded from the spinneret to pass through a space of about 3 mm, the same procedure as in Example 1 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1.

Comparative Example 5

Except for using Spinneret D and allowing the spinning solution extruded from the spinneret to pass through a space of about 3 mm, the same procedure as in Example 1 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1.

Example 5

Except for using Spinneret C and allowing the spinning solution extruded from the spinneret to pass through a space of about 3 mm, the same procedure as in Example 1 was carried out to produce a polyacrylonitrile based precursor fiber bundle. The spinning solution was able to pass through the spinning process without significant problems. The same procedure as in Example 1 was carried out to produce a carbon fiber bundle. Evaluation results are given in Table 1.

Example 6

Except for using a coagulation bath containing a 30% aqueous solution of dimethyl sulfoxide controlled at 15° C., the same procedure as in Example 4 was carried out to produce a polyacrylonitrile based precursor fiber bundle. The spinning solution was able to pass through the spinning process without significant problems. Except for performing carbonization below a maximum temperature of 1,800° C., the same procedure as in Example 1 was carried out to produce a carbon fiber bundle. Evaluation results are given in Table 1.

Example 7

Except for using a coagulation bath containing a 30% aqueous solution of dimethyl sulfoxide controlled at 15° C. and allowing the spinning solution extruded from the spinneret to pass through a space of about 5 mm, and using a precursor fiber bundle with a single-fiber fineness of 0.7 dtex, the same procedure as in Example 1 was carried out to produce a polyacrylonitrile based precursor fiber bundle. The spinning solution was able to pass through the spinning process without significant problems. Except for performing carbonization below a maximum temperature of 1,000° C., the same procedure as in Example 1 was carried out to produce a carbon fiber bundle. Evaluation results are given in Table 1.

Example 8

The same procedure as in Example 6 was carried out to produce a polyacrylonitrile based precursor fiber bundle. The spinning solution was able to pass through the spinning process without significant problems. Except for performing carbonization below a maximum temperature of 2,400° C., the same procedure as in Example 1 was carried out to produce a carbon fiber bundle. Evaluation results are given in Table 1.

Example 9

Except for performing the steam stretching step under a tension of 300 g, the same procedure as in Example 1 was carried out to produce the various products including carbon fiber. Evaluation results are given in Table 1.

Comparative Example 6

Except for performing the steam stretching step under a tension of 300 g, the same procedure as in Comparative example 2 was carried out to produce the various products including carbon fiber. Evaluation results are given in Table 1.

Example 10

The carbon fiber bundle obtained in Example 1 was further subjected to electrochemical surface treatment with an electric quantity of 200 C/g in a sulfuric acid aqueous solution with a conductivity of 10 mS. Evaluation results are given in Table 1.

Evaluation for Fracture Origin

The carbon fiber bundles prepared in Examples 1, 9, and 10 were subjected to single-fiber tensile test with a gauge length of 10 mm. Fractured single-fibers were recovered and their fracture surfaces were observed. Test was performed for 150 single-fibers, and 79, 72, and 80 single-fibers were recovered respectively for fracture surface observation. The fracture surfaces were observed by SEM and evaluated in terms of the positions of fracture origin. First, the long axis was rotated by ±45 degrees about the intersection between the long axis and the short axis to produce two new line segments. As these two line segments divided the circumference of the fiber into four arcs, the arc that contains the top of the quasi-oval shape was named A1 while the others were named A2, A3, and A4 clockwise. Each single-fiber was examined to determine the position, i.e., Arc A1, A2, A3, or A4, of the fracture origin. For all of the single-fibers observed by SEM, the number of fracture origin found in Arc A1 was determined. Results showed that the number was 19 in the carbon fiber bundle of Example 1, 23 in the carbon fiber bundle of Example 9, and 21 in the carbon fiber bundle of Example 10. These were divided by the total number of observed single-fibers to determine the degree of concentration of fracture origin in Arc A1, i.e., near the top of the quasi-oval shape. It was found to be 24%, 32%, and 26% respectively for the carbon fiber bundles produced in Examples 1, 9, and 10.

Results of the examination of fracture origin show that it is possible to evaluate the difference in the positions of fracture origin if the single-fibers have quasi-oval cross sections. In Example 9, since steam stretching was performed under a small tension, the single-fibers swayed largely to cause significant contact between single-fibers or their contact with the inner wall of the steam stretching tube, possibly leading to easy formation of defects as indicated by a slight decrease in strand strength. This resulted in the concentration of fracture origin in the vicinity of the top of the quasi-oval shape. A similar decrease in strand strength is seen in Comparative example 7, suggesting that a decrease in strand strength attributable to the same cause as inferred in Example 9 can occur regardless of the cross-sectional shape. Compared to this, electrochemical surface treatment was carried out to a slightly excessive degree in Example 10. Accordingly, the concentration of fracture origin was not seen although a decrease in strand strength took place. These findings indicate that the use of our carbon fiber bundle makes it possible to distinguish between when a decrease in strand strength occurs in the steam stretching step and when a similar decrease in strand strength occurs in the electrochemical treatment step. Such analysis is theoretically impossible for carbon fiber composed of single-fibers with circular cross sections.

Results in Comparative Examples 4 to 6 suggest that even when the cross section perpendicular to the fiber direction has a quasi-oval shape, a decrease in strand strength can occur if the content of single-fibers that meet both Equations (1) and (2) is small. The cross section has a flattened shape in Comparative Examples 4 and 5. In Comparative Example 5, although the degree of flattening is low compared to above cases, the degree of asymmetry of the quasi-oval shape is excessively high and results show that if it is outside our specified range, a decrease in strand strength can occur even when the cross section is quasi-oval to allow the positions of fracture origin to be distinguished easily.

TABLE 1

| | Spinning Process Spinning method (—) | Feature (—) | Cross-sectional shape of carbon fiber | | | | | Cross-sectional shape of carbon fiber Average for crossectional shape over all single-fibers | | CF properties | | | Strand properties | |
|---|---|---|---|---|---|---|---|---|---|---|---|---|---|---|
| | | | Proportion of single-fibers meeting both Eqs. (1) and (2) (%) | Proportion of single-fibers meeting both Eqs. (3) and (4) (%) | Average over single-fibers meeting both Eqs. (1) and (2) | | | | | Surface area ratio (—) | Average diameter (μm) | Specific gravity (—) | Strength (GPa) | Elastic modulus (GPa) |
| | | | | | La/Lb (—) | Ld/Lc (—) | | <La/Lb> (—) | <Ld/Lc> (—) | | | | | |
| Example 1 | SWS | quasi-oval | 72 | 68 | 1.10 | 1.11 | | 1.11 | 1.09 | 1.02 | 6.9 | 1.80 | 5.2 | 230 |
| Example 2 | SWS | quasi-oval | 76 | 72 | 1.15 | 1.17 | | 1.16 | 1.15 | 1.01 | 6.9 | 1.80 | 5.4 | 230 |
| Example 3 | SWS | quasi-oval | 56 | 56 | 1.16 | 1.12 | | 1.18 | 1.10 | 1.01 | 5.5 | 1.80 | 6.0 | 300 |
| Example 4 | SWS | quasi-oval | 72 | 40 | 1.12 | 1.22 | | 1.13 | 1.20 | 1.01 | 5.5 | 1.80 | 6.2 | 330 |
| Comparative Example 1 | SWS | quasi-circle | 0 | 0 | 1.02 | 1.02 | | 1.02 | 1.02 | 1.00 | 5.4 | 1.80 | 5.9 | 295 |
| Comparative Example 2 | SWS | quasi-circle | 0 | 0 | 1.03 | 1.02 | | 1.03 | 1.02 | 1.00 | 6.9 | 1.80 | 5.2 | 230 |
| Comparative Example 3 | SWS | β-shape | N/A | N/A | N/A | N/A | | N/A | N/A | 1.05 | 6.8 | 1.80 | 4.6 | 230 |
| Comparative Example 4 | SWS | quasi-oval | 12 | 4 | 1.21 | 1.13 | | 1.25 | 1.10 | 1.01 | 6.9 | 1.80 | 4.8 | 230 |
| Comparative Example 5 | SWS | quasi-oval | 36 | 16 | 1.07 | 1.30 | | 1.09 | 1.27 | 1.02 | 6.9 | 1.80 | 4.7 | 230 |
| Example 5 | SWS | quasi-oval | 56 | 36 | 1.18 | 1.23 | | 1.22 | 1.22 | 1.01 | 6.9 | 1.80 | 5.1 | 230 |
| Example 6 | SWS | quasi-oval | 72 | 44 | 1.08 | 1.20 | | 1.08 | 1.19 | 1.01 | 5.6 | 1.73 | 5.2 | 290 |
| Example 7 | SWS | quasi-oval | 60 | 60 | 1.10 | 1.08 | | 1.10 | 1.07 | 1.02 | 5.8 | 1.78 | 4.4 | 240 |
| Example 8 | SWS | quasi-oval | 76 | 64 | 1.07 | 1.15 | | 1.08 | 1.15 | 1.00 | 5.4 | 1.80 | 4.5 | 380 |
| Example 9 | SWS | quasi-oval | 64 | 64 | 1.09 | 1.10 | | 1.11 | 1.08 | 1.02 | 6.9 | 1.80 | 5.1 | 230 |
| Comparative Example 6 | SWS | quasi-circle | 0 | 0 | 1.03 | 1.02 | | 1.03 | 1.02 | 1.00 | 6.9 | 1.80 | 5.1 | 230 |
| Example 10 | SWS | | Same as for Example 1 | | | | | Same as for Example 1 | | | | | 4.8 | 230 |

"N/A" means that evaluation was impossible.

TABLE 2

| | Cross-sectional shape of stabilized fiber | | |
|---|---|---|---|
| Feature (—) | Proportion of single-fibers meeting both Eqs. (1) and (2) (%) | Average for cross-sectional shape of single-fibers | |
| | | La/Lb (—) | Ld/Lc (—) |
| Example 1 quasi-oval | 92 | 1.17 | 1.12 |
| Example 2 quasi-oval | 92 | 1.19 | 1.16 |
| Comparative Example 2 quasi-circle | 0 | 1.03 | 1.02 |

INDUSTRIAL APPLICABILITY

In a carbon fiber bundle and a carbon fiber bundle produced from a stabilized fiber bundle, their quasi-oval cross-sectional shape allows the relative position of a fracture origin in a single-fiber to be determined based on observations of the fracture surface without suffering from deterioration in strength, proccessability, or high-degree proccessability compared to those with circular cross sections. When an abnormal fall is found in the tensile strength of a carbon fiber bundle made as a manufactured product, the investigation of causes can be performed effectively to serve to reduce losses due to decreased opportunities, leading to a decrease of manufacturing steps for carbon fiber.

The invention claimed is:

1. A carbon fiber bundle containing single-fibers 40% or more of which have a quasi-oval cross section perpendicular to a fiber direction and meet both Equations (1) and (2):

$$1.04 < La/Lb < 1.16 \quad (1)$$

$$1.08 < Ld/Lc < 1.20 \quad (2)$$

wherein La is length of a long axis defined as a line segment connecting two points farthest away from each other on a circumference of the quasi-oval cross section of a single-fiber; Lb is length of a short axis defined as a line segment extending perpendicular to the long axis, passing through a midpoint of the long axis, and connecting two points on the circumference; and when the long axis is divided into four equal parts to produce two line segments perpendicular to the long axis each of which passes through a point other than the midpoint of the long axis and connects two points on the circumference, Lc and Ld are defined as length of a shorter one and that of a longer one, respectively.

2. The carbon fiber bundle as described in claim 1 that meets both Equations (5) and (6), wherein $<La/Lb>$ and $<Ld/Lc>$ respectively represent an average of La/Lb values and Ld/Lc values of the single-fibers in the carbon fiber bundle:

$$<La/Lb> < 1.20 \quad (5)$$

$$<Ld/Lc> < 1.20 \quad (6).$$

3. The carbon fiber bundle as claimed in claim 1, wherein an average diameter of the single-fibers is 4 to 7 μm.

4. The carbon fiber bundle as claimed in claim 1, wherein an average surface area ratio of the single-fibers is 1.00 to 1.10.

5. The carbon fiber bundle as claimed in claim 1, wherein strand strength is 5 GPa or more and strand elastic modulus is 230 GPa or more.

6. The carbon fiber bundle as claimed in claim 1, wherein 40% or more of the single-fibers contained meet both Equations (1) and (2'):

$$1.04 < La/Lb < 1.16 \quad (1)$$

$$1.10 < Ld/Lc < 1.20 \quad (2').$$

7. The carbon fiber bundle as claimed in claim 1, wherein 40% or more of the single-fibers contained meet both Equations (1) and (2"):

$$1.04 < La/Lb < 1.16 \quad (1)$$

$$1.12 < Ld/Lc < 1.20 \quad (2").$$

* * * * *